(12) United States Patent
Sakashita et al.

(10) Patent No.: US 7,930,124 B2
(45) Date of Patent: Apr. 19, 2011

(54) PROTECTION CONTROL MEASUREMENT SYSTEM

(75) Inventors: Hironori Sakashita, Fuchu (JP); Katsuhiko Sekiguchi, Tama (JP); Yoshinori Takei, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 12/208,597

(22) Filed: Sep. 11, 2008

(65) Prior Publication Data

US 2009/0076745 A1 Mar. 19, 2009

(30) Foreign Application Priority Data

Sep. 13, 2007 (JP) ................................. 2007-238561

(51) Int. Cl.
*G01D 18/00* (2006.01)
*G01P 21/00* (2006.01)
*G01R 35/00* (2006.01)
(52) U.S. Cl. ........................................................ 702/85
(58) Field of Classification Search .................. 702/85
See application file for complete search history.

(56) References Cited

U.S. PATENT DOCUMENTS

| | | | | |
|---|---|---|---|---|
| 5,414,697 | A * | 5/1995 | Osaki ............................. | 370/236 |
| 6,285,917 | B1 * | 9/2001 | Sekiguchi et al. ............. | 700/239 |
| 6,662,124 | B2 | 12/2003 | Schweitzer, III et al. | |
| 6,711,131 | B1 | 3/2004 | Shiobara | |
| 2004/0083272 | A1 * | 4/2004 | Fuehrer et al. ................. | 709/207 |
| 2007/0086134 | A1 | 4/2007 | Zweigle et al. | |
| 2010/0007333 | A1 * | 1/2010 | Sekiguchi et al. ............. | 324/113 |

FOREIGN PATENT DOCUMENTS

| | | |
|---|---|---|
| JP | 2000-92109 | 3/2000 |
| JP | 2005-124206 | 5/2005 |

OTHER PUBLICATIONS

Kim, J. H. et al., "Method for Transmitting Real-Time Multimedia Data in Ethernet(R) Network," Patent Abstract of Japan, JP. No. 2005-124206, 1 Sheet, (May 12, 2005).
Nakamura, Y., "Fully Double Ethernet(R) HUB Device and Network System," Patent Abstract of Japan, JP. No. 2000-092109, 1 Sheet, (Mar. 3, 2000).

* cited by examiner

*Primary Examiner* — Michael P Nghiem
(74) *Attorney, Agent, or Firm* — Finnegan, Henderson, Farabow, Garrett & Dunner, L.L.P.

(57) ABSTRACT

This invention provides a protection control measurement system, with excellent economy and maintainability. In the protection control measurement terminal 1, electric quantity acquisition and transmitter 14-1 determines synchro-phasor quantities from electric quantity data and transmits the synchro-phasor quantities to arrival time-guaranteed transmitter 15-1. The arrival time-guaranteed transmitter 15-1 transmits in real- time the synchro-phasor quantities to the parent station device 3. Setting value transmitter 14-2 transmits setting value data to the message transmitter 15-2, which performs message transmission to the parent station device 3 over the communication network 2. In the parent station device 3, electric quantity arithmetic processor 32-1 calculates electric quantities as close as possible to true values by multiplying received synchro-phasor quantities by setting value data. The protection control measurement arithmetic processor 32-2 performs arithmetic operations for accident judgment for protection control measurement terminals 1 from the magnitudes of electric quantities and voltage phase differences.

8 Claims, 16 Drawing Sheets

FIG. 5
(a)
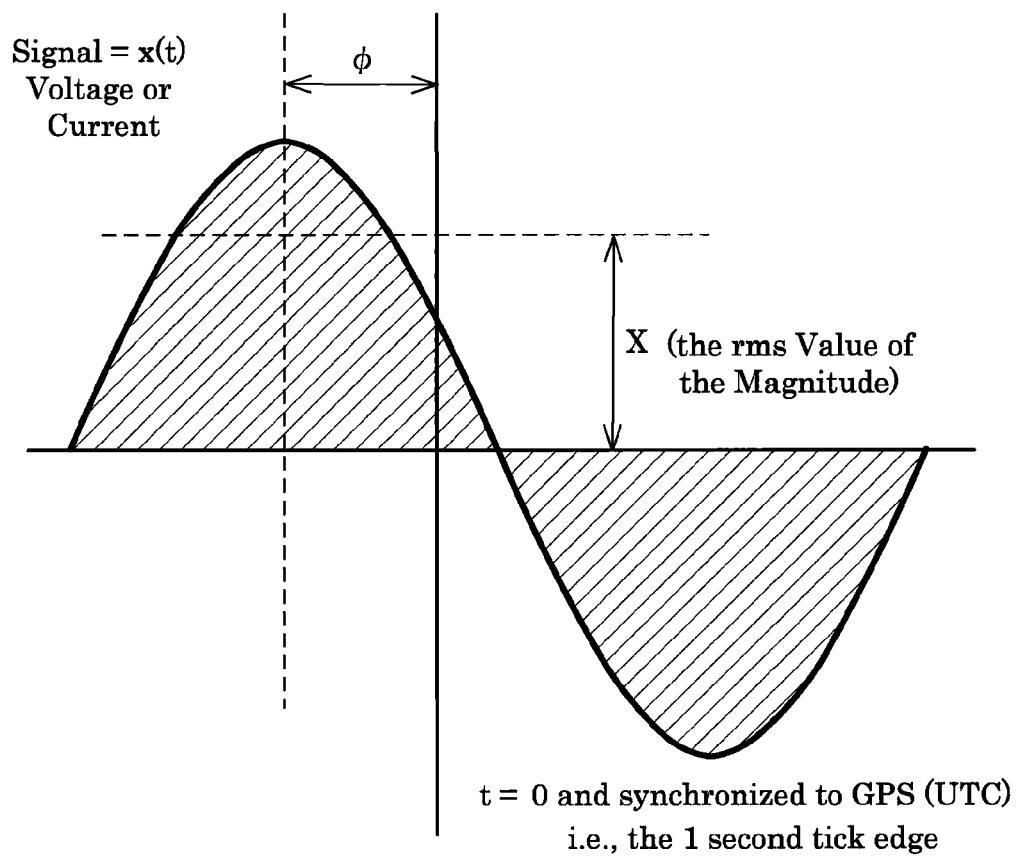
(b)
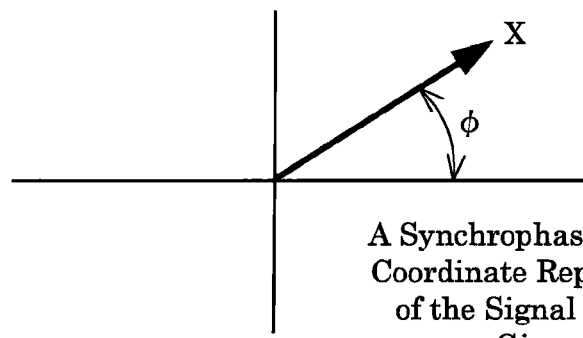
A Synchrophasor is a Polar Coordinate Representation of the Signal x(t) and is Given as:
$X = X_{real} + jX_{imaginary}$

FIG. 7

| MESSAGE TRANSMISSION ID: 1-1 | MAGNITUDE CONVERSION VALUE k1 OF VOLTAGE 1 | PHASE CONVERSION VALUE k2 OF VOLTAGE 1 | ... | MAGNITUDE CONVERSION VALUE k8 OF CURRENT 23 | PHASE CONVERSION VALUE k9 OF CURRENT 23 | VERIFICATION DATA |

PROTECTION CONTROL MEASUREMENT SYSTEM

BACKGROUND OF THE INVENTION

1. Field of the Invention

This invention relates to a protection control measurement system which performs protection, control and measurement of an electric power system, and relates to a system with excellent economy and maintainability, which collects protection control measurement data using a communication network.

2. Description of the Related Art

Data communication means between terminals, installed in transformer substations, electric power plants, and similar of the prior art, have generally employed Ethernet (a registered trademark) and TCP/IP general-use protocols. In particular, as means for transmitting data reliably in a fixed length of time using Ethernet, communication means such as those described in Japanese Patent Application Laid-open No. 2005-124206 and Japanese Patent Application Laid-open No. 2000-92109 have been proposed.

In Japanese Patent Laid-open Application No. 2005-124206, a method of transmission of real-time data over Ethernet is disclosed in which, in order to resolve the problem of the occurrence of fluctuations in the delay times of transmission packets by suppressing collisions which occur when large amounts of real-time data are transmitted simultaneously, priority rights are assigned to real-time data, and in addition a communication protocol is adopted for collision avoidance. In this Japanese Patent Application Laid-open No. 2005-124206, the transmitted real-time data is video data.

Further, in Japanese Patent Application Laid-open No. 2000-92109 a duplex Ethernet hub device and network for realizing real-time data transmission are disclosed, for cases in which scheduled data must be reliably transmitted over an industrial network within a fixed time. Specifically, in a network adopting full-duplex Ethernet, a configuration is disclosed in which are provided transmission monitoring means for monitoring the amount of transmission data from each station device in each period, and transmission control means for imparting instructions to station devices for transmission control, based on data amounts acquired via the transmission monitoring means. By this means, control data for industrial use and similar for which real-time transmission is necessary can be transmitted with a guarantee of transmission within a fixed time.

There is a desire to apply communication means using Ethernet such as those described above when performing protection, control and measurement of power systems and power installations. Use of Ethernet in this way is advantageous with respect to economy and maintainability; for example, electric quantities can be collected from an electric power system or power installations at a plurality of locations via such Ethernet, protection control measurement operations can be performed to judge whether protection and control of the electric power system is necessary, and electric quantities at a plurality of locations can be compared and measured, among other advantages.

As explained above, in protection control measurement operations of power systems and similar, when transmitting electric quantities over a communication network using Ethernet, it is necessary to introduce communication technologies such as those disclosed in Japanese Patent Application Laid-open No. 2005-124206 and Japanese Patent Application Laid-open No. 2000-92109 when performing real-time transmission.

However, in a protection control measurement system which performs protection, control and measurement of an electric power system, among the data used in protection control measurement, the collected voltage, current, and other electric quantity data must be transmitted in real-time, with arrival times at terminals and parent stations guaranteed; but the set points of protection relays, values of various settings and similar are non-real-time data, for which guarantees of arrival times are more relaxed, and so need not be transmitted in real-time. Hence while Japanese Patent Application Laid-open No. 2005-124206 and Japanese Patent Application Laid-open No. 2000-92109 present means for realizing real-time transmission, there is no disclosure relating to protection control measurement data which includes non-real-time data for use in protection control measurement systems.

Specifically, in Japanese Patent Application Laid-open No. 2005-124206, communication means are proposed in which priority rights are assigned to real-time data, and in addition a communication protocol is applied for collision avoidance; but as explained above, the real-time data which is transmitted and received is video data, and is not protection, control, or measurement data. And, in Japanese Patent Application Laid-open No. 2000-92109, the data transmitted and received in real-time transmission within an industrial network is industrial data, the details of which are unclear.

That is, as described above, in Japanese Patent Application Laid-open No. 2005-124206 and Japanese Patent Application Laid-open No. 2000-92109 it is assumed that all data is data which must be transmitted in real-time. Hence when the technology of Japanese Patent Application Laid-open No. 2005-124206 or the technology of Japanese Patent Application Laid-open No. 2000-92109 is applied to a protection control measurement system, it may be possible to transmit electric quantity data and similar in real-time, but various setting values and other non-real-time data is also transmitted by real-time communication means, so that there is the cost-related problem that the hardware scale must be made larger than is necessary.

SUMMARY OF THE INVENTION

This invention is proposed in order to resolve the above problem, and has as an object the provision of a protection control measurement system, with excellent economy and maintainability, which collects protection control measurement data via a communication network from a plurality of terminals, positioned in transformer substations, electric power plants, incoming transfer installations, and similar, which acquire electric quantities.

In order to attain the above object, a protection control measurement system of this invent, comprising measurement terminals which acquire electric quantities from an electric power system and electrical installations, a parent station device having arithmetic operation means for performing protection and control or measurement processing based on the electric quantities, and a communication network connecting the parent station device with at least one measurement terminal, is characterized in that the measurement terminals each comprises real-time transmission means for transmitting the electric quantities to the parent station device within a prescribed time, and message transmission means for transmitting to the parent station device, as setting values, correction coefficients to improve the operation accuracy of the protection and control or measurement processing, the transmission priority of the message transmission being lower than that of the real-time transmission; the real-time transmission means transmits the electric quantities within a prescribed time with higher priority than the message transmission over the communication network; the message transmission means transmits the setting values within a prescribed time after transmission of the electric quantities over the communication network; and the arithmetic operation means performs correction in which the electric quantities received from the real-time transmission means are corrected using the setting values received from the message transmission means, and calculates the input electric quantities.

Further, this invention is characterized in that Ethernet is adopted as the network, and moreover that the setting values are functions to correct transient response characteristics of analog filters of the measurement terminals. Further, in one mode of this invention, the arithmetic operation means transmits control instructions to the measurement terminals when an anomaly is judged to be present in the electric power system and electrical installations, and the measurement terminals execute control to trip breakers connected to the electric power system or electrical installations upon receiving the control instructions.

Further, in one mode of this invention, at least one measurement terminal comprises real-time transmission means for transmitting the electric quantities to another measurement terminal within a prescribed time, and message transmission means for transmitting to the other measurement terminal, as setting values, correction coefficients to improve the operation accuracy of the protection and control or measurement processing, the transmission priority of the message transmission being lower than that of the real-time transmission; the real-time transmission means transmits the electric quantities within a prescribed time with higher priority than the message transmission over the communication network; the message transmission means transmits the setting values after transmission of the electric quantities over the communication network, within a prescribed time; and the arithmetic operation means performs correction of the electric quantities received from the real-time transmission means of the other measurement terminals, using the setting values received from the message transmission means of the other measurement terminals, to calculate input electric quantities.

By means of the invention described above, the configuration of measurement terminals can be simplified, and a highly economical protection control measurement system can be proposed. Specifically, whereas high-performance hardware is necessary when multiplying acquired electric quantity data by correction values for each individual analog channel in a measurement terminal, in this invention multiplication by correction values can be performed on the side of the parent station device, so that the configuration of measurement terminals can be simplified.

That is, when selecting hardware to accommodate the word lengths of the microprocessor, bus and similar as well as wide bus widths considering that digits are carried in operation results when multiplying by correction values in a measurement terminal, costs are increased, and so in a parent station device of this invention a function is adopted for multiplication of correction values.

Further, by means of this invention, electric quantity packets which must be transmitted in real-time and correction values and other setting value data which need not be transmitted in real-time can be transmitted over the same communication paths, so that transmission over single communication paths is possible without resulting in a decline in performance of the protection control measurement system.

Also, even when there is a need to modify correction values which are setting value data for measurement terminals (modification of system primary-side installations, changes with aging of hardware, and similar), by revising the software of arithmetic operation means in the parent station device, high-accuracy operations can once again be performed. Because there is no cost incurred in repairing or modifying measurement terminals on-site, excellent economy is attained. Moreover, the above advantageous result is augmented as the number of measurement terminals increases.

BRIEF DESCRIPTION OF THE DRAWINGS

FIG. 5 shows an example of arithmetic operation processing of synchro-phasor quantities in the first embodiment of the invention;

FIG. 7 shows an example of the frame configuration of message transmission packets in the first embodiment of the invention;

DESCRIPTION OF THE PREFERRED EMBODIMENTS

1. First Embodiment

[1.1 Configuration]

Figure 1:
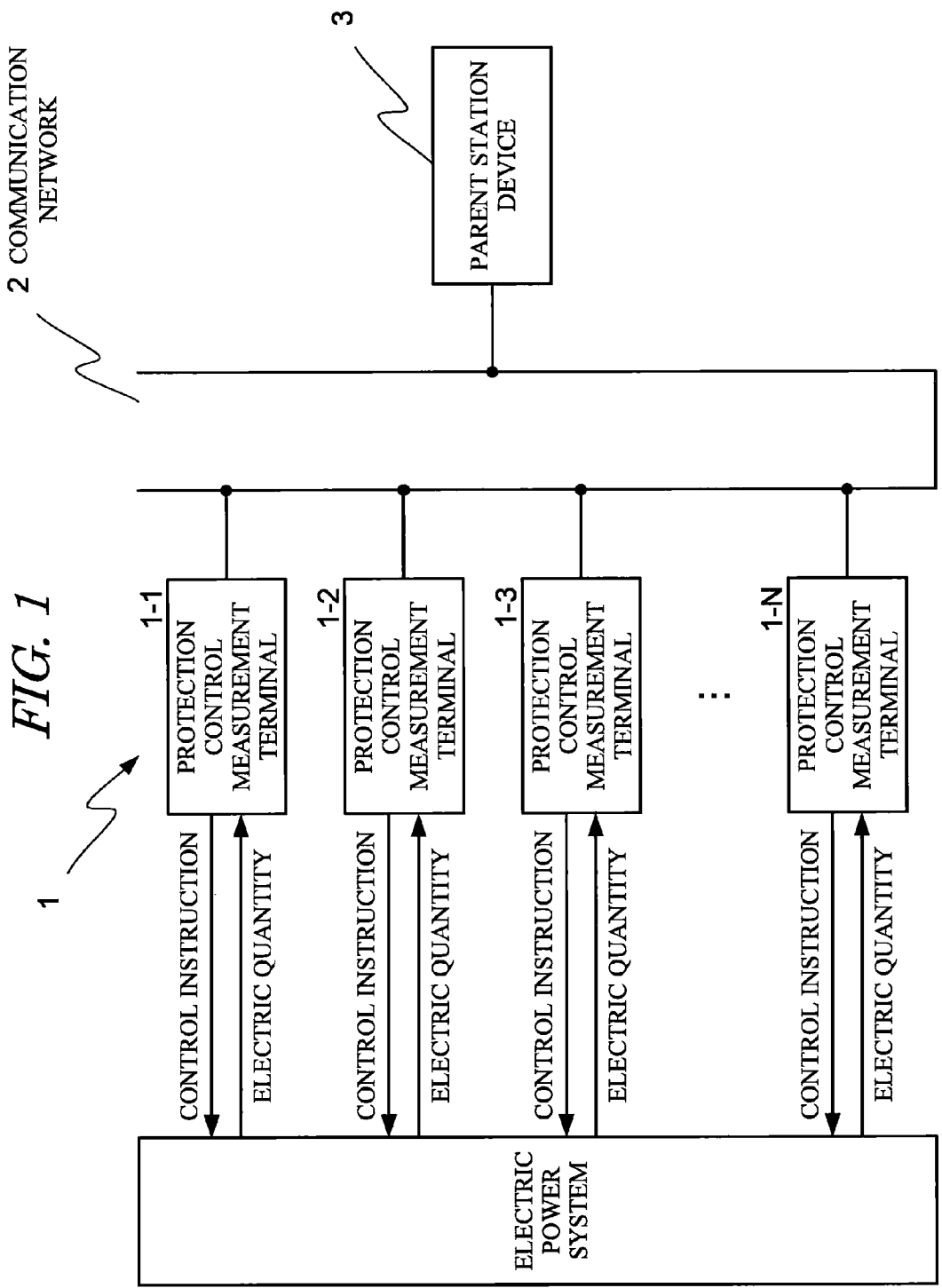
FIG. 1 shows an example of the hardware configuration of a protection control measurement system of a first embodiment of the invention.

Next, the configuration of a protection control measurement system of this embodiment is explained below, referring to FIG. 1 through FIG. 3. FIG. 1 is a simplified diagram showing the relation between protection control measurement terminals 1, the communication network 2, and the parent station device 3 in this embodiment.

As shown in FIG. 1, in N protection control measurement terminals 1-1 to 1-N (where N>1), installed at the same or at different electric-supply stations, electric quantities, such as voltages and currents, for the electric power system (including transmission lines, transformers, generators, and the other electrical equipment and electrical installations) are measured, and the electric quantities are transmitted over the communication network 2 to the parent station device 3.

In this parent station device 3, electric quantities sent from each of the protection control measurement terminals 1 are consolidated, protection operation, control operation and measurement operation are performed, and based on the operation results, control instructions are output to each of the protection control measurement terminals 1 as necessary. By this means, tripping of breakers and other control is performed by each of the protection control measurement terminals 1 based on control instructions from the parent station device 3.

Next, the basic configurations of the protection control measurement terminals 1, communication network 2, and parent station device 3 are explained in detail below.

[1.1.1 Basic Configuration of Protection Control Measurement Terminals]

Figure 2:
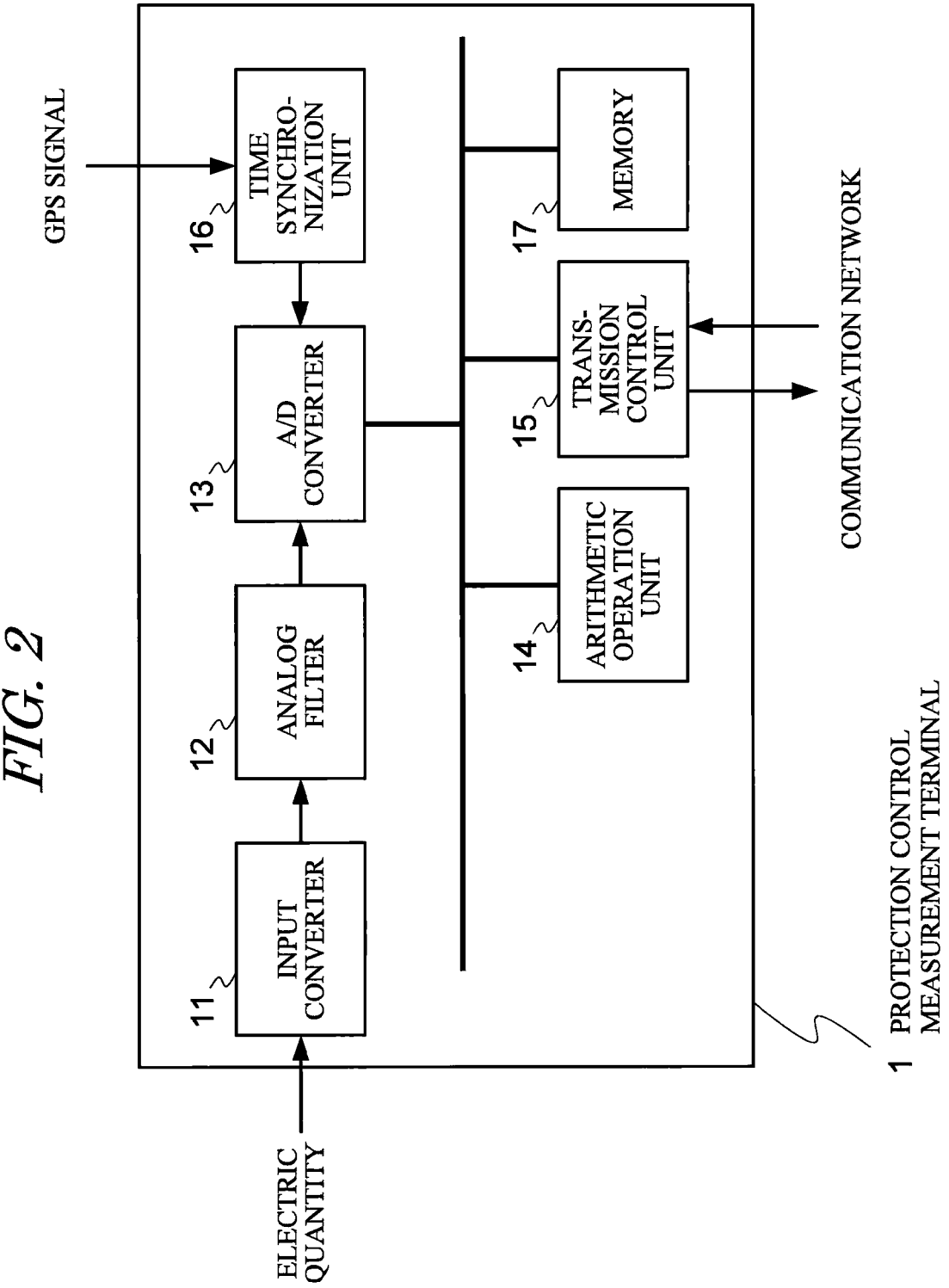
FIG. 2 shows an example of the configuration of the protection control measurement system of the first embodiment of the invention.

FIG. 2 shows the hardware configuration of a protection control measurement terminal 1 of this embodiment. Here, the input converter 11 converts input electric quantities, which are voltages and currents of transmission lines, transformers, generators, and similar within electric-supply stations, into electric quantity data of prescribed magnitude.

The analog filter 12 is a circuit which removes prescribed frequency components from output electric quantity data converted by the input converter 11; the A/D converter 13 performs sampling and analog/digital conversion to convert electric quantity data, with prescribed frequency components removed by the analog filter 12, into digital quantities.

Sampling in this A/D converter 13 is performed with timing synchronized for example to the UTC (Coordinated Universal Time) received from a GPS (Global Positioning System) satellite; in the time synchronization unit 16, a timing signal is generated at prescribed times based on UTC time data received from the GPS antenna, and this signal is sent to the A/D converter 13 for use in synchronization.

Processing by the arithmetic operation processing unit 14 is described in detail below, but this unit comprises a microprocessor, and is means for performing arithmetic operation of synchro-phasor quantities and other electric quantities. The transmission control unit 15 performs transmission and reception of data with the parent station device 3 via the communication network 2. The A/D converter 13, arithmetic operation processing unit 14, and transmission control unit 15 are connected to a bus together with memory 17 within the terminal, and are capable of exchanging data therebetween.

[1.1.2 Basic Configuration of Communication Network]

In this invention, as the physical layer of the communication network, a cable, optical fiber, wireless LAN, microwaves, power line carrier, or similar can be used. Within an electric power enterprise, use of an intranet, or a VPN connecting a plurality of enterprises, or the Internet, is also assumed. In this embodiment, an explanation is given for an example in which Ethernet is used.

[1.1.3 Basic Configuration of Parent Station Device]

Figure 3:
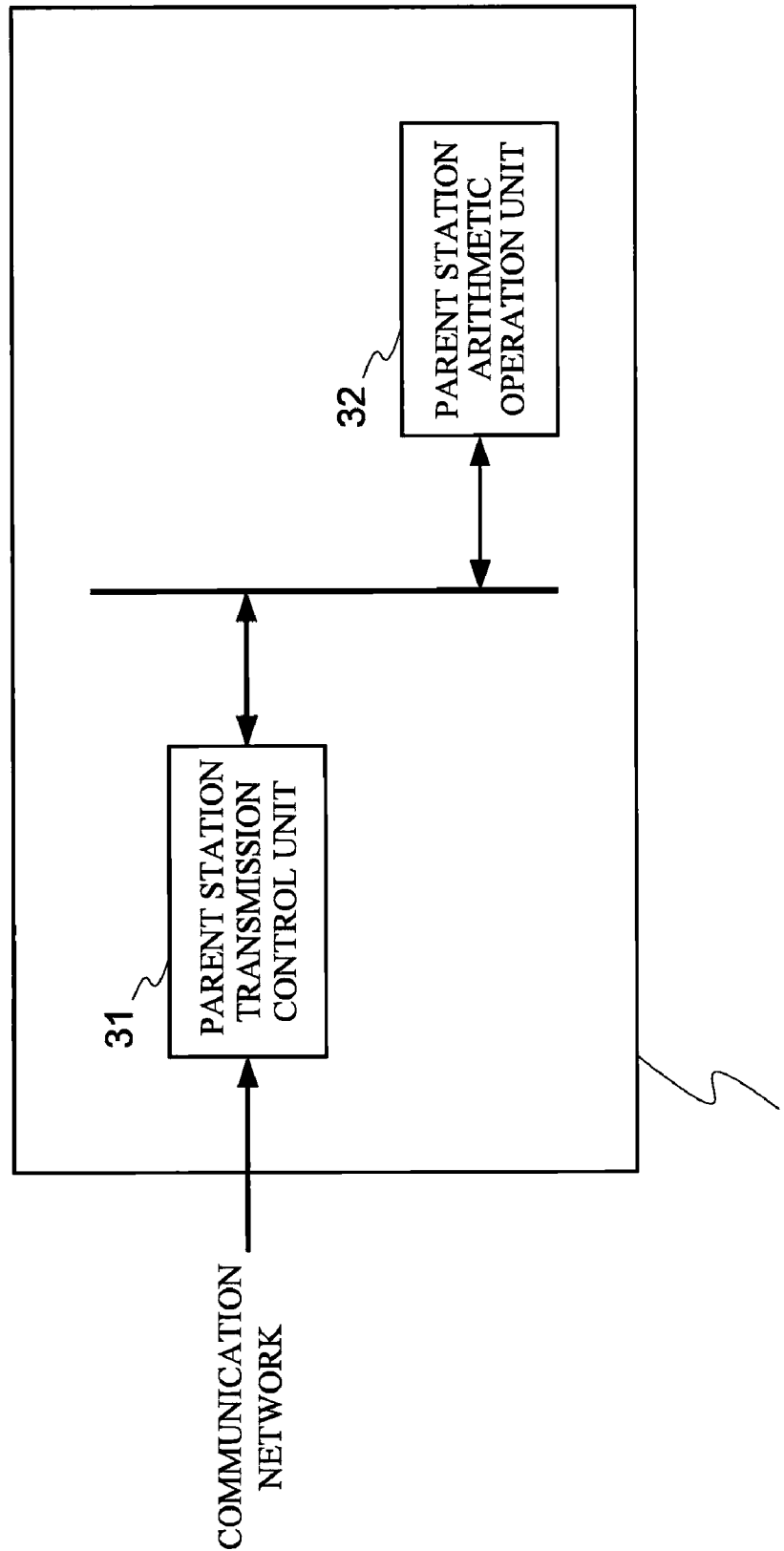
FIG. 3 shows an example of the configuration of the parent station device in the first embodiment of the invention.

FIG. 3 shows the basic configuration of a parent station device 3. As explained above, the parent station device 3 receives electric quantities and other data sent from protection control measurement terminals 1 over the communication network 2, consolidates this electric quantity data, performs protection operation, control operation and measurement operation, and sends control instructions to each of the protection control measurement terminals 1.

The parent station transmission control unit 31 receives synchro-phasor quantities and other electric quantity data sent from the transmission control unit 15 of a protection control measurement terminal 1 via the communication network 2, and transmits the data to a parent station arithmetic operation processing unit 32, described below. Synchro-phasor quantities from each of the protection control measurement terminals 1 comprises the protection control measurement terminal ID of the transmission source, and timing times converted to digital data by the A/D conversion unit 13, and are sent, as the same frame, to the parent station transmission control unit 31 of the parent station device 3.

The parent station arithmetic operation processing unit 32 arranges synchro-phasor quantities from each of the protection control measurement terminals 1-1 to 1-N. Specifically, synchro-phasor quantities for the same time are extracted from each of the protection control measurement terminals 1-1 to 1-N, and processing is performed to align the phasor quantities in the same frame. Then, from within the aligned frame, electric quantity data for required times is extracted, and protection control measurement arithmetic operation is performed based on software. The specific processing is explained below.

[1.2 Specific Configuration of a Protection Control Measurement Terminal and Parent Station Device]

Figure 4:
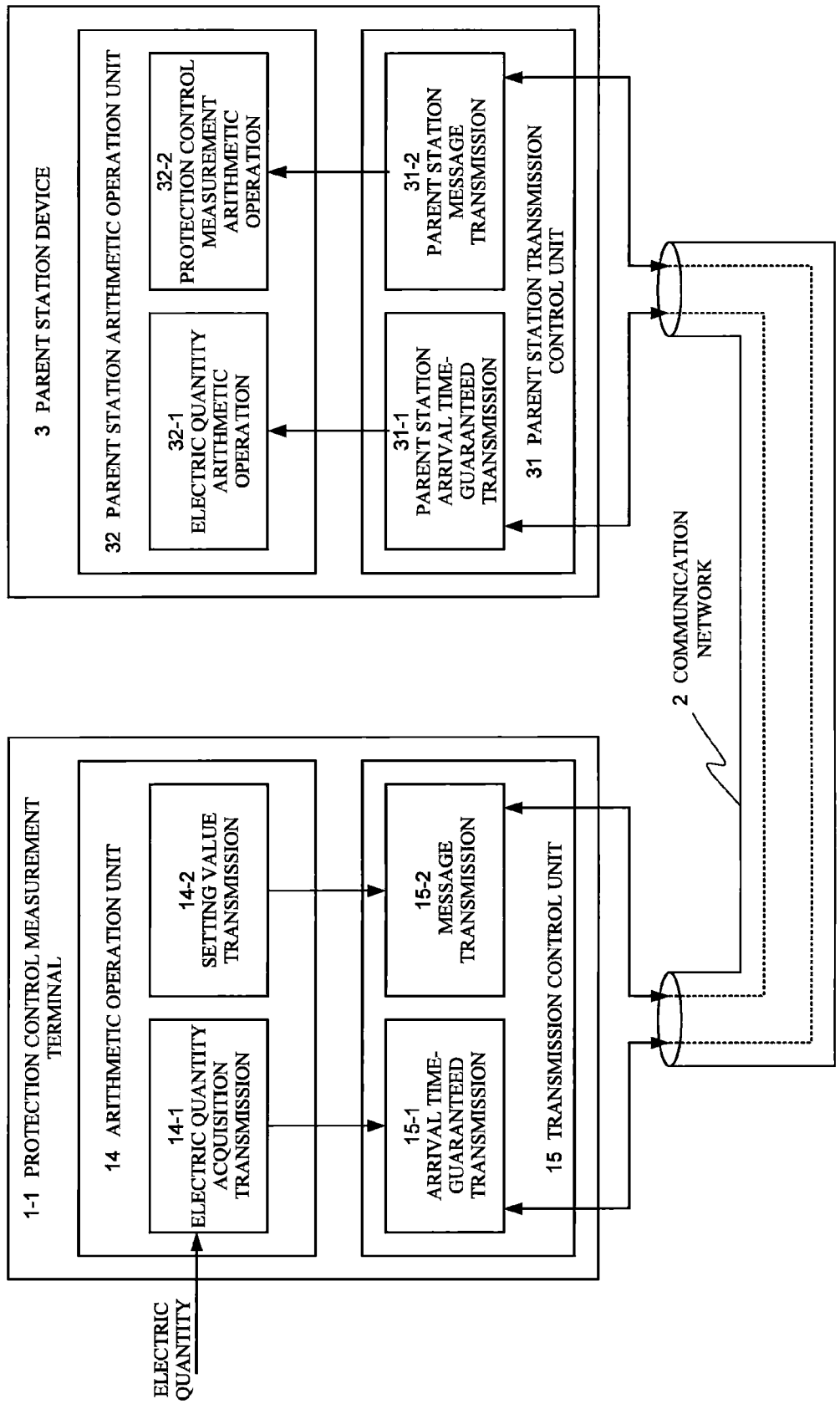
FIG. 4 shows an example of the specific configuration of the protection control measurement system of the first embodiment of the invention.

Next, the specific configuration of a protection control measurement terminal 1 and parent station device 3 of this embodiment are explained below, referring to FIG. 4. In FIG. 4, the same reference numerals are assigned to the same units as those of FIG. 1 through FIG. 3, and repetitive descriptions thereof are omitted. Moreover in FIG. 4, from the standpoint of simplifying the drawing, in the protection control measurement terminal 1 only the arithmetic operation processing unit 14 and the transmission control unit 15, which are characteristic constituent components of the invention, are shown, and other constituent components are omitted.

As in FIG. 4, the arithmetic operation processing unit 14 of the protection control measurement terminal 1 comprises electric quantity acquisition and transmission means 14-1, which operates digital data which has been sampled and digitally converted by the A/D conversion unit 13 to obtain synchro-phasor quantities, and transmits the synchro-phasor quantities to arrival time-guaranteed transmission means 15-1, described below, in the transmission control unit 15.

In this embodiment, in order to improve operation accuracy in the system, correction coefficients are established for each analog channel as correction values, and during system operation are set, as unchanging setting values, in memory 17 within the protection control measurement terminal 1. Here, the setting value transmission means 14-2 provided within the arithmetic operation processing unit 14 extracts the setting values from memory 17, and transmits the setting values to the message transmission means 15-2, described below, within the transmission control unit 15.

The transmission control unit 15 within the protection control measurement terminal 1 comprises arrival time-guaranteed transmission means 15-1, which receives synchro-phasor quantities transmitted by the above-described electric quantity acquisition and transmission means 14-1, transmits in real-time the synchro-phasor quantities to the parent station device 3 over the communication network 2. In the transmission control unit 15 is provided message transmission means 15-2, which receives setting value data which need not be transmitted in real-time, transmitted by the setting value transmission means 14-2, and performs message transmission to the parent station device 3 over the communication network 2.

On the other hand, in the parent station device 3, parent station arrival time-guaranteed transmission means 31-1, which performs transmission and reception of electric quantity data for synchro-phasor quantities with the arrival time-guaranteed transmission means 15-1 of protection control measurement terminals 1, via the communication network 2, is provided in the parent station transmission control unit 31. Also, within the parent station transmission control unit 31, parent station message transmission means 31-2 are provided, to perform transmission and reception of setting value data with the message transmission means 15-2 in the protection control measurement terminal 1.

Further, the parent station arithmetic operation processing unit 32 comprises electric quantity arithmetic operation means 32-1, which calculates electric quantities as close as possible to true values by multiplying phasor quantities received from the parent station arrival time-guaranteed transmission means 31-1 by setting value data received from the parent station message transmission means 31-2. In this parent station arithmetic operation processing unit 32, protection control measurement arithmetic operation means 32-2 is provided, which performs protection control measurement arithmetic operations for accident judgment for protection control measurement terminals 1 from the magnitudes of electric quantities operated by the electric quantity arithmetic operation means 32-1 and from voltage phase differences.

[1.3 Results of Action]
[1.3.1 Synchro-phasor Quantity Arithmetic Operation in Protection Control Measurement Terminals]

Next, arithmetic operation processing for synchronized phase quantities in protection control measurement terminals 1 realized in the above configuration is explained, referring to FIG. 5.

In each of the protection control measurement terminals 1-1 to 1-N, prescribed electric quantity data converted by the input converter 11 is narrowed to data in a specific frequency band by the analog filter 12, and analog quantities are sampled at the same times as UTC times obtained from a GPS satellite and are converted to digital values by the A/D converter 13. Then, the electric quantity acquisition and transmission means 14-1 of the arithmetic operation processing unit 14 operates synchro-phasor quantities from this digitally converted electric quantity data.

These synchro-phasor quantities are two quantities, a magnitude X and phase φ, which specify digitally converted electric quantity data, as indicated in FIG. 5; the electric quantity acquisition and transmission means 14-1 operates synchro-phasor quantities, and simultaneously transmits the phasor quantities to the transmission control unit 15 for transmission to the parent station device 3. The phase φ in a synchro-phasor quantity is an instantaneous phase angle of a cosine function with respect to UTC (Coordinated Universal Time) timing obtained from 1 PPS (1 pulse per second) signals received by a GPS receiver, acquired via the time synchronization unit 16.

Here, if signals are given by $$x(t)=\sqrt{2}X\cos(wt+\phi)$$ [Expression (1)]

then the phasor representation is given by the complex quantity of the following expression.

$$X = X_{real} + jX_{imaginary}$$ [Expression (2)]
$$= Xe^{j\phi}$$
$$= X(\cos\phi + j\sin\phi)$$

As an advantage when using synchro-phasor quantities, this manner of representation is easily understood and facilitates handling. Thus synchro-phasor quantities operated by the arithmetic operation processing units 14 of each of the protection control measurement terminals 1-1 to 1-N are consolidated in the parent station device 3 by the communication network 2, via the arrival time-guaranteed transmission means 15-1 of the transmission control units 15.

[1.3.2 Frame Generation Processing (for Real-time Transmission)]

Figure 6:
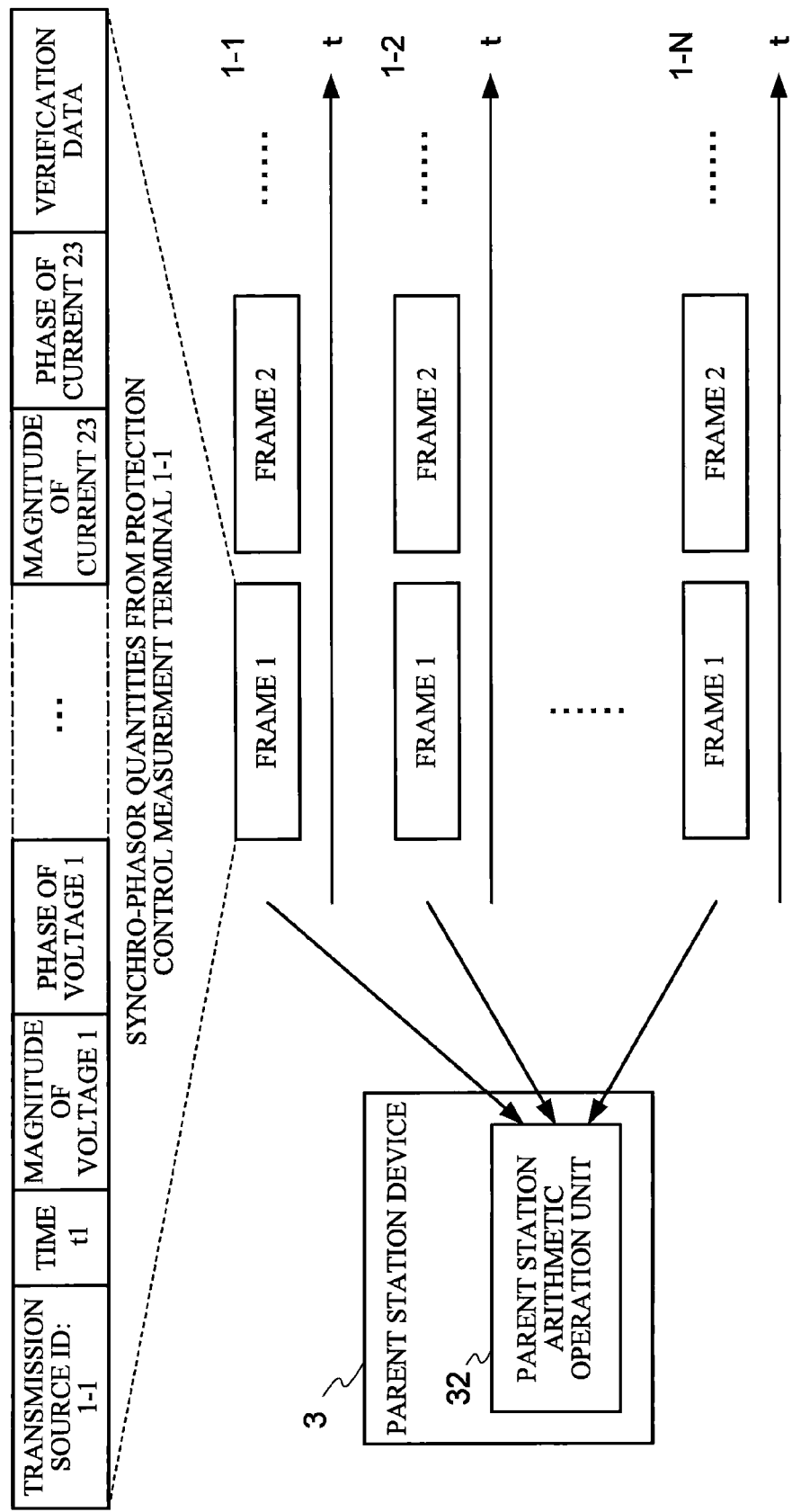
FIG. 6 shows an example of the frame configuration of arrival time-guaranteed packets in the first embodiment of the invention.

Next, frame generation processing when sending synchro-phasor quantities operated by the electric quantity acquisition and transmission means 14-1 of the arithmetic operation processing unit 14 to the parent station device 3 is explained, referring to FIG. 6.

Each of the protection control measurement terminals 1-1 to 1-N incorporates, within frames generated by the electric quantity acquisition and transmission means 14-1 in the arithmetic operation processing unit 14, electric-supply station bus voltages (voltage 1: a phase voltage, voltage 2: b phase voltage, voltage 3: c phase voltage), and power transmission line currents (current 11: a phase current of circuit 1, current 12: b phase current of circuit 1, current 13: c phase current of circuit 1, current 21: a phase current of circuit 2, current 22: b phase current of circuit 2, current 23: c phase current of circuit 2), for a total of nine quantities, as shown in FIG. 6. Further, in FIG. 6, the manner in which the magnitudes and phases of these phasor quantities are sent periodically to the parent station device 3 is shown.

In FIG. 6, details of phasor quantities which have been sampled and digitally converted at time t1 (the magnitudes and phases of bus voltages and power transmission line currents) are shown; further, at the beginning of the frame are prepended the transmission source ID of the protection control measurement terminal 1-1 and the sampling time of sampling by the A/D converter 13. At the end of the frame, verification data, in the form of CRC data or similar, is appended.

And, in the N protection control measurement terminals 1-1 to 1-N, synchro-phasor quantities sampled at the same time t1 are sent, as a separate frame-generated packet, to the parent station device 3 by the electric quantity acquisition and transmission means 14-1, via the arrival time-guaranteed transmission means 15-1 of the transmission control unit 15.

[1.3.3 Real-time Transmission]

As explained above, an electric quantity packet resulting from phasor quantity operations and frame generation is sent to the parent station device 3 by the electric quantity acquisition and transmission means 14-1 in the arithmetic operation processing unit 14 of the protection control measurement terminal 1. When this packet is transmitted to the parent station device 3, it is sent to the communication network 2 as a packet for real-time transmission via the arrival time-guaranteed transmission means 15-1 within the transmission control unit 15.

As the specific processing for real-time transmission by the arrival time-guaranteed transmission means 15-1, first, one node among all the nodes which are access points for communication from the protection control measurement terminal 1 to the parent station device 3 is made a synchronization node. Then, after this synchronization node issues a synchronous frame, at a node which has acquired transmission rights, electric quantity packets with higher priority than setting value packets, described below, are transmitted to the parent station device 3 via the communication network 2, and by executing control such that transmission times do not exceed the guaranteed arrival time, which is a prescribed transmission time between the protection control measurement 1 and the parent station device 3, real-time transmission is realized.

By this means, the electric quantity packets (hereafter called arrival time-guaranteed transmission packets) sent from the protection control measurement 1, in a mode in which arrival time is guaranteed, arrive at the parent station device 3. In the protection control measurement system of this embodiment, in order to operate electric quantities within a fixed time and make judgments as to tripping breakers and similar, the arrival time-guaranteed packets must be transmitted in real-time to the protection control measurement arithmetic operation means 32-2; this is realized by the means described above.

[1.3.4 Message Transmission]

Here, as described above, electric quantities pass through the input converter 11, analog filter 12 and A/D converter 13 in the protection control measurement terminal 1 and are converted into digital values; but because there are individual differences between hardware components (proportional errors, fixed errors, digital bit weighting), in general, errors occur in the input converter 11, analog filter 12, and similar.

Hence in this embodiment, in order to improve operation accuracy in the protection control measurement system, correction coefficients are determined for each analog channel, and by using these as correction values for multiplication by the digital values after A/D conversion, phasor quantities as close as possible to the true values of the electric quantities are determined. These correction values are regarded as unchanging setting values during normal system operation, and are set in advance in memory 17 within the protection control measurement terminals 1.

Here, in the arithmetic operation processing unit 14, the setting values set in advance are extracted from memory 17 by the setting value transmission means 14-2, and are sent as packets to the message transmission means 15-2 within the transmission control unit 15. And, upon receiving the setting values, the message transmission means 15-2 transmits packets of the setting values (hereafter called message transmission packets) to the parent station device 3 by simultaneously using the communication network 2 used by the arrival time-guaranteed transmission means 15-1.

However, arrival time-guaranteed transmission packets transmitted to the communication network 2 by the arrival time-guaranteed transmission means 15-1 arrive at the parent station device 3 with higher transmission priority than message transmission packets transmitted by the message transmission means 15-2.

FIG. 7 shows the contents of a message transmission packet, including setting values, transmitted to the parent station device 3 by the message transmission means 15-2 in the transmission control unit 15. As shown in the drawing, the packet has added, after the transmission ID of the protection control measurement terminal 1-1 to 1-N, setting values, as constant values, which are correction values for each of the analog channels (K1, K2, . . . ).

Because the setting values do not change during operation of the protection control measurement system, even when the arrival time of arrival time-guaranteed packets transmitted by arrival time-guaranteed transmission means 15-1 is approximately 1 ms to 5 ms, the arrival time of message transmission packets transmitted by message transmission means 15-2 of several hundred ms to several seconds is sufficient.

Figure 8:
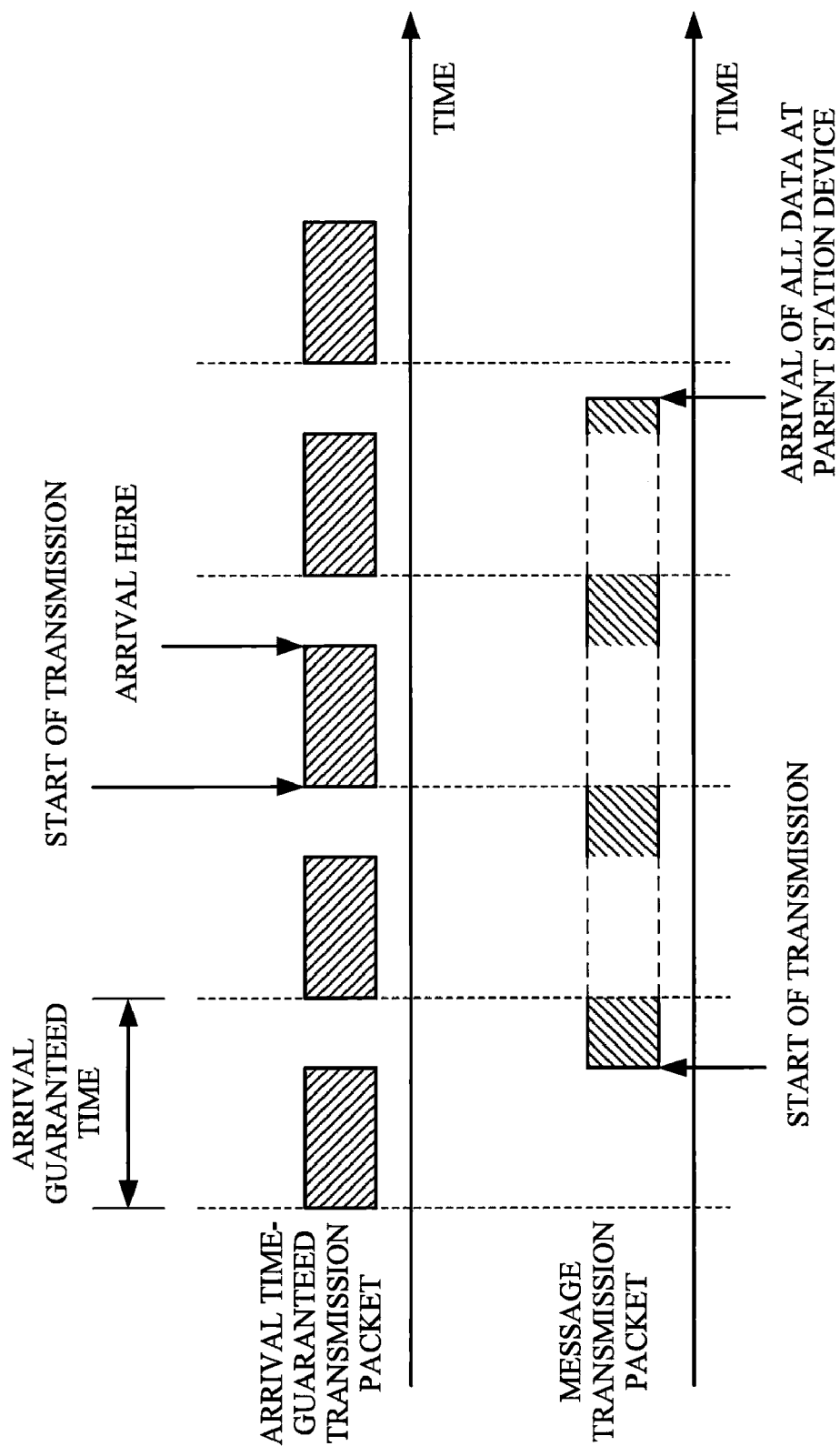
FIG. 8 shows an example of transmission/reception timing for packets in the communication network of the first embodiment of the invention.

In FIG. 8, the manner of arrival time-guaranteed transmission, which is real-time transmission, and message transmission, which is not real-time transmission, over the communication network 2 is illustrated. As shown in FIG. 8, transmission by the arrival time-guaranteed transmission means 15-1 of arrival time-guaranteed packets, for which real-time transmission is required, takes priority over message transmission, and is transmitted from a protection control measurement terminal 1 within the guaranteed arrival time.

Here, among the guaranteed arrival time, message transmission of message transmission packets is performed by the message transmission means 15-2 of all protection control measurement terminals 1 in the free time after transmission of packets for which the arrival time must be guaranteed. By this means, both arrival time-guaranteed transmission and message transmission can be used simultaneously on the communication network 2.

[1.3.5 Arithmetic Operation Processing of Parent Station Device]

Next, arithmetic operation processing of data received by the parent station device 3 in arrival time-guaranteed transmission and of data received by the parent station device 3 in message transmission is explained.

The arrival time-guaranteed transmission packets and message packets shown in FIG. 8 are received by parent station arrival time-guaranteed transmission means 31-1 and parent station message transmission means 31-2, respectively, provided in the parent station transmission control unit 31 of the parent station device 3. Each of the packets received by the parent station transmission control unit 31 is transmitted to the electric quantity arithmetic operation means 32-1 of the parent station arithmetic operation processing unit 32.

In this electric quantity arithmetic operation means 32-1, for each analog channel corresponding to both types of packets, electric quantity data which is arrival time-guaranteed packet data received by the parent station arrival time-guaranteed transmission means 31-1 is multiplied by setting values which are message transmission packet data received by the parent station message transmission means 31-2, to calculate electric quantities input to protection control measurement terminals 1. By this means, errors, A/D conversion ratios, and similar are corrected for each analog channel, and values close to the actual electric quantities in the electric power system are determined as phasor quantities.

Electric quantities from each of the protection control measurement terminals 1, converted in this way, are further summarized as same-time frames in the parent station arithmetic operation processing unit 32 of the parent station device 3.

[1.3.6 Arithmetic Operation for Protection Control Measurement]

Using these frames with summaries at the same times, the protection control measurement arithmetic operation means 32-2 performs protection control measurement arithmetic operations using for example expressions (3) and (4) below.

$$|\phi_i - \phi_j| < \phi_k \qquad \text{[Expression (3)]}$$

$$|V_i| < V_k, |V_j| < V_k \qquad \text{[Expression (4)]}$$

Here "$\phi$" is the phase of a representative phase at each electric-supply station, and in terms of FIG. 6 and FIG. 7, is relevant to the phase of voltage 1 of the synchro-phasor quantities for a protection control measurement terminal 1. The voltage phases of synchro-phasor quantities from arbitrary protection control measurement terminals I and J ($1 \leq I, J \leq N$, $I \neq J$) are represented by $\phi_i$ and $\phi_j$ respectively.

The protection control measurement arithmetic operation means 32-2 constantly and periodically monitors whether, according to expression (3), the voltage phase difference for different protection control measurement terminals 1 does not exceed a prescribed value $\phi_k$. This is equivalent to constantly monitoring the phase difference of bus voltages at different electric-supply stations.

It is known that, when some accident has occurred within the power supply system at an electric-supply station, the phases of bus voltages connected to the equipment or transmission lines at which the accident has occurred fluctuate. That is, by constantly monitoring voltage phase differences using expression (3), the protection control measurement arithmetic operation means 32-2 can determine whether a system accident has occurred taking a prescribed value $\phi_k$ as reference, and can identify the location of occurrence of the system accident.

The protection control measurement arithmetic operation means 32-2 uses expression (4) to confirm that the magnitudes of the voltages from different protection control measurement terminals 1 are lower than a prescribed voltage $V_k$, and perform arithmetic operation of the above-described expression (3) on condition that expression (4) obtains.

[1.3.7 Flow of Arithmetic Operation Processing in the Parent Station Device]

Specific processing for protection control measurement arithmetic operation in the parent station device 3 is explained below, referring to the flowchart of FIG. 9.

First, a judgment is made as to whether, in the parent station arrival time-guaranteed transmission means 31-1 and parent station message transmission means 31-2 provided in the parent station transmission control unit 31 of the parent station device 3, as new data from a protection control measurement terminal 1, an arrival time-guaranteed transmission packet and message transmission packet have been received (step 901).

If new data has been received (YES), the parent station arithmetic operation processing unit 32 reads the data, and for the analog channel corresponding to both packets, the electric quantity arithmetic operation means 32-1 multiplies the electric quantity data received by the parent station arrival time-guaranteed transmission means 31-1 with the setting value data received by the parent station message transmission means 31-2, to calculate electric quantities input to the protection control measurement terminal 1 (step 902).

In order to monitor electric quantities which are phasor quantities and phase differences from different protection control measurement terminals 1, an index is updated in order (step 904). Here, the protection control measurement arithmetic operation means 32-2, by using equation (4), judges whether the magnitudes of voltages operated by each of the electric quantity arithmetic operation means 32-1 in different protection control measurement terminals 1 are lower than the prescribed voltage $V_k$ (step 905).

When a voltage magnitude satisfies the condition of expression (4) (YES), that is, is lower than the prescribed voltage $V_k$, a further judgment is made as to whether the voltage phase difference of a different protection control measurement terminal 1 having this voltage satisfies the condition of expression (3) (step 906). Specifically, this protection control measurement arithmetic operation means 32-2 performs monitoring to judge whether the voltage phase difference from different protection control measurement terminals 1 exceeds a prescribed value $\phi_k$.

If it is judged that the voltage phase difference does not satisfy the condition of expression (3), that is, that the phase difference exceeds the prescribed value $\phi_k$ (NO), then a decision is made that some accident has occurred within the electric power system (step 907). That is, the read-in phasor quantity phase is fluctuating significantly, and so occurrence of a system accident is acknowledged, and the location of occurrence of the accident in the electric power system of the protection control measurement terminal 1 is identified.

And, in the parent station arithmetic operation processing unit 32, a judgment is made as to whether checks of a bus line voltages have been completed (step 903); if completed (YES), a judgment is made in step 901 as to whether new data has been received by the parent station transmission control unit 31. If not all checks have been completed (NO), the index is again updated in step 904, and the processing of step 905 and beyond is repeated.

In step 905, when the voltage magnitude does not satisfy the condition of expression (4) (NO), that is, is lower than the prescribed voltage $V_k$, in step 903 the bus line voltage combination is checked. In step 906, if the voltage phase difference satisfies the condition of expression (3), that is, when the phase difference is judged not to exceed the prescribed value $\phi_k$ (YES), similar processing is performed.

[1.4 Example of Arithmetic Operation Processing Based on Frequency]

In the above, voltages and current of the electric power system were assumed as the electric quantities; but the first embodiment also includes embodiments in which active power, reactive power, frequency, and other quantities of an electric power system are taken to be electric quantities, and data is transmitted from protection control measurement terminals 1 to the parent station device 3 using similar transmission formats. A frequency an electric power system in such an arithmetic operation example is given by expressions (5) and (6) below, in which the phase $\phi$ of a synchro-phasor quantity is differentiated by time.

$$2\pi \Delta f = \frac{d\phi}{dt} \qquad \text{[Expression (5)]}$$

$$f(\text{Hz}) = 60 + \Delta f \qquad \text{[Expression (6)]}$$

In the protection control measurement arithmetic operation means 32-2 of the parent station device 3, the phase $\phi$ of a synchro-phasor quantity is extracted from the electric quantity operated in step 902 in the above-described processing flow, and expression (5) and expression (6) are used to calculate the electric power system frequency f. Here, when a generator within an electric-supply station goes offline due to an accident or similar, a change in frequency propagates from the location of the system disturbance to the periphery, and so frequencies f calculated by the protection control measurement arithmetic operation means 32-2 can be used to infer the location of the disturbance.

Figure 10:
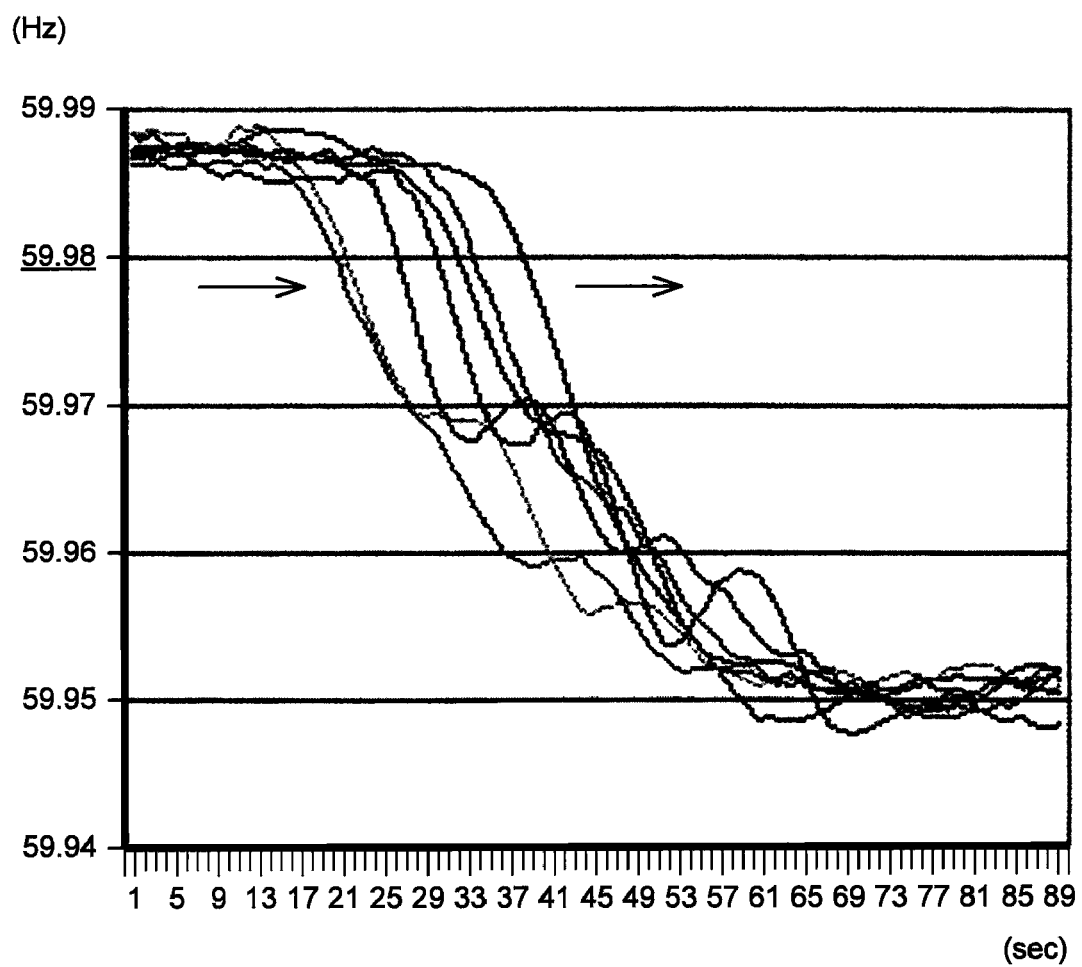
FIG. 10 shows an example of periodic variation during power system disturbance in the first embodiment of the invention.

An example of a time change in frequency at seven locations of an electric-supply station when a generator goes offline due an accident or similar is explained, referring to FIG. 10. In the figure, focusing on the portion at which the frequency is 59.98 Hz, the frequency, which had been somewhat less than 59.99 Hz, changes to 59.98 Hz in order from electric-supply stations closer to the generator which has gone offline.

In this way, propagation of a change in frequency from the location of the system disturbance to the periphery can be utilized to infer the location of the disturbance from points at which the frequency is observed. Further, from the rate of time change of the calculated frequencies, the change in the generation quantity can also be inferred. That is, the protection control measurement arithmetic operation means 32-2 can perform various protection control measurement arithmetic operations.

By means of the above embodiment, the configuration of protection control measurement terminals can be simplified, and a highly economical protection control measurement system can be proposed. Specifically, whereas high-performance hardware is required when electric quantity data is multiplied by setting value data in protection control measurement terminals for each analog channel, in this invention multiplication by the setting value data can be performed by the parent station device, so that the configuration of the protection control measurement terminals can be simplified.

That is, when multiplication by setting value data is performed by protection control measurement terminals, considering digits are carried in arithmetic operation results when multiplying by setting value data, hardware must be selected to accommodate the greater word lengths of the microprocessor, bus and similar as well as wide bus widths, so that costs are increased; hence in this invention, multiplication by setting value data is performed by the parent station device.

Further, by means of this invention, packets of electric quantities which must be handled in real-time and correction values and other setting value data which need not be handled in real-time can be transmitted over the same communication paths, so that transmission over a single communication path can be realized without detracting from the performance of the protection control measurement system.

Further, even in cases in which correction values, which are setting value data for protection control measurement terminals, must be modified (modification of system primary-side installations, changes with aging of hardware, and similar), by revising the software of the arithmetic operation means in the parent station device, high-accuracy arithmetic operations can once again be performed. Because there is no cost incurred in repairing or modifying measurement terminals on-site, excellent economy is attained. Moreover, the above advantageous result is augmented as the number of protection control measurement terminals increases.

1.5 Other Embodiments Related to the First Embodiment

In the first embodiment of the invention, as explained above, GPS is sued as a mechanism of synchronization over a broad area; however, a mode may be employed in which the timing of a clock internal to each of the protection control measurement terminals 1 is used to perform sampling of electric quantities.

Figure 11:
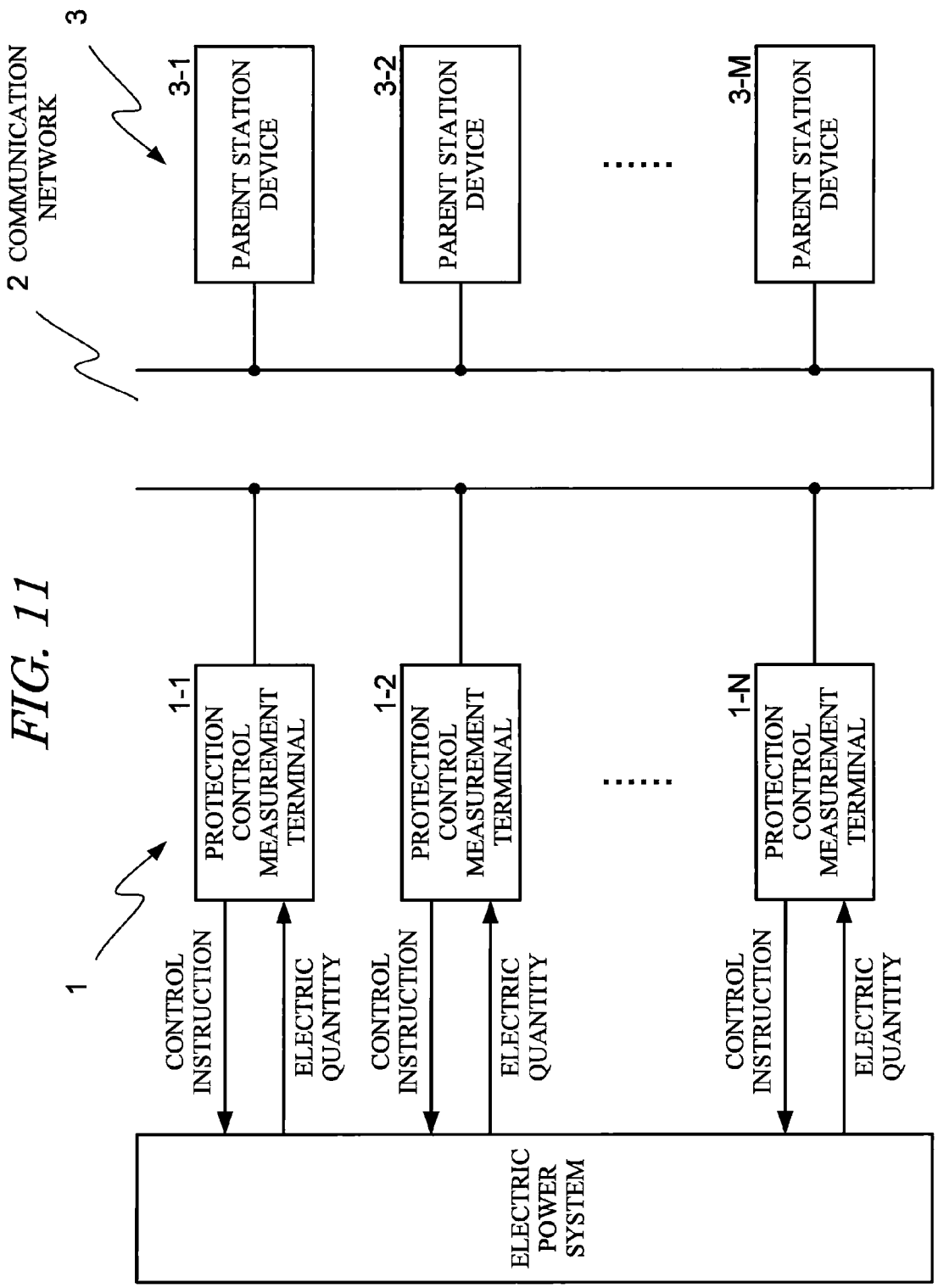
FIG. 11 is a (first) diagram showing an example of the hardware configuration of the protection control measurement system of another embodiment, related to the first embodiment of the invention.

Further, the first embodiment is not limited to the above mode in which a single parent station device 3 is used, and when there has been a large increase in the number of protection control measurement terminals 1, resulting in a heavy processing load on the parent station device 3, a plurality of parent station devices (3-1 to 3-M) may be provided as shown in FIG. 11, to distribute the processing load.

Figure 12:
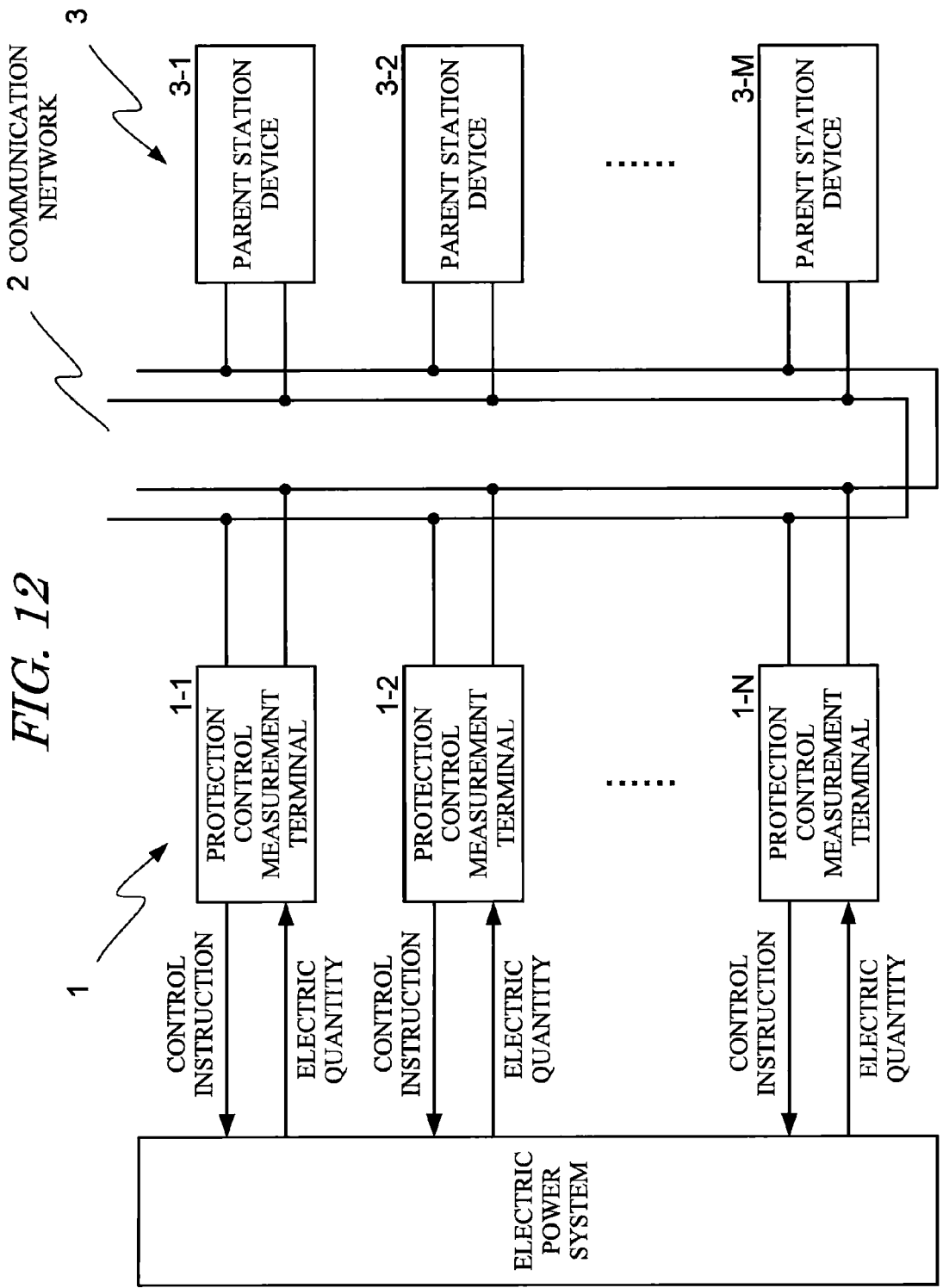
FIG. 12 is a (second) diagram showing an example of the hardware configuration of the protection control measurement system of another embodiment, related to the first embodiment of the invention.

Also, when there is a single parent station device 3, in the unlikely event of a problem in the parent station device 3, there is the concern that the entire system may be halted; on the other hand, when the communication network 2 comprises a single system, in the unlikely event of a problem in the communication network, there is the concern that the entire system may be halted. Hence the first embodiment also includes a mode in which two systems of a communication network 2 and parent station device 3 with the same functions are deployed as shown in FIG. 12, thereby enhancing the reliability of the system as a whole.

In the first embodiment of the invention, as explained above, synchro-phasor quantities are used as electric quantities; however, in place of such phasor quantities, a mode may be employed in which instantaneous values of voltages and currents are used. When using instantaneous values, rather than a transmission frame configuration in which magnitudes and phases are transmitted in pairs as phasor quantities as shown in FIG. 6, instantaneous values at each sampling time are transmitted, as in FIG. 13.

Figure 13:
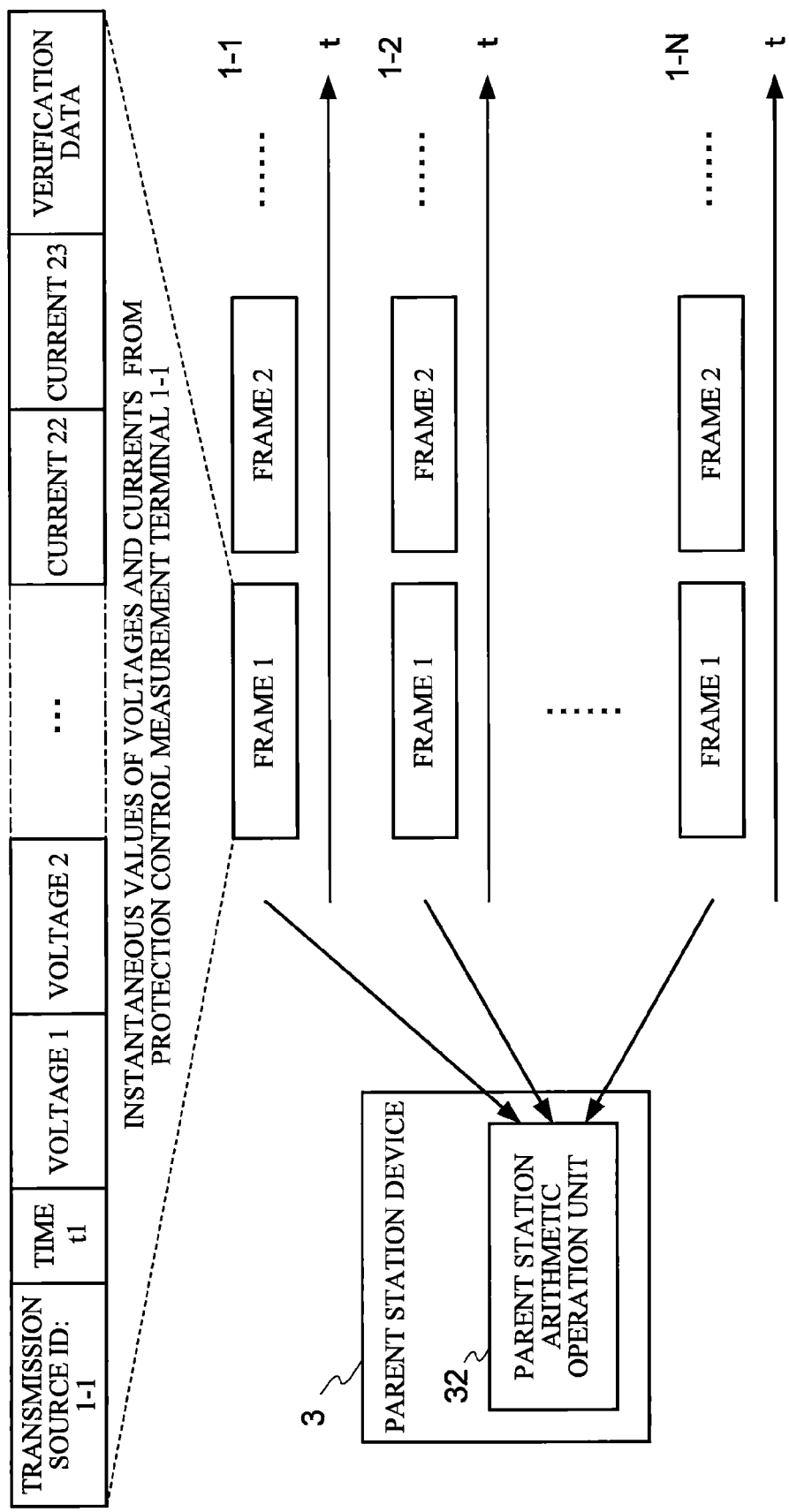
FIG. 13 is a (third) diagram showing an example of the hardware configuration of the protection control measurement system of another embodiment, related to the first embodiment of the invention.

When using phasor quantities, by converting instantaneous values of electric quantities sampled at protection control measurement terminals 1 to obtain the phasor quantities, there is the advantage that handling is facilitated when performing various protection control measurement calculations in the parent station arithmetic operation processing unit 32. On the other hand, when transmitting instantaneous values, as shown in FIG. 13, unprocessed, more "raw" data can be handled by the parent station arithmetic operation processing unit 32, and so there is the advantage that through innovations in applied arithmetic operation, higher-accuracy arithmetic operation can be performed.

Further, an embodiment is also included in which, by providing in the parent station device 3 a selection function to select transmission of phasor quantities or transmission of instantaneous values from the same protection control measurement terminal 1, the selection instruction can be made from the parent station device 3. In this case, phasor quantities and instantaneous values can be handled in coexistence in the parent station device 3, and the advantages obtained when using phasor quantities and when using instantaneous values are both secured.

Further, when instantaneous value transmission is performed from each of the protection control measurement terminals 1-1 to 1-N, the following processing is performed to prevent the occurrence of differences in transient response characteristics of the electric power system arising due to analog filter characteristics of the protection control measurement terminals 1-1 to 1-N. Specifically, the analog filter characteristics (gain, frequency) for each of the protection control measurement terminals 1-1 to 1-N are transmitted as functions to the parent station device 3, and in the parent station device 3, the received functions are used to perform conversions such that the individual transient response characteristics are equal during response operation processing. Conversions in the parent station device 3 in this case are for example performed as indicated in expression (7).

$$f_1 \times g_1 = F_1$$

$$f_2 \times g_2 = F_2$$

$$\vdots$$

$$f_n \times g_n = F_n \quad \text{[Expression (7)]}$$

Here, $f_1, f_2, \ldots f_n$ are functions representing the analog filter characteristics of the protection control measurement terminals 1-1 to 1-N, $g_1, g_2, \ldots g_n$ are conversion functions of the parent station device 3, and $F_1, F_2, \ldots F_n$ are filter characteristics on the applied arithmetic operation side corresponding to the protection control measurement terminals 1-1 to 1-N obtained by conversion.

In equation (7), if the conversion functions $g_1, g_2, \ldots g_n$ of the parent station device 3 are appropriate, then the $F_1, F_2, \ldots F_n$ which are filter characteristics are all the same value. The filter characteristics $F_1, F_2, \ldots F_n$ are equivalent to setting value data described in the above embodiment, and so are exchanged between the protection control measurement terminals 1 and the parent station device 3 by message transmission means.

2. Second Embodiment

[2.1 Configuration]

Figure 14:
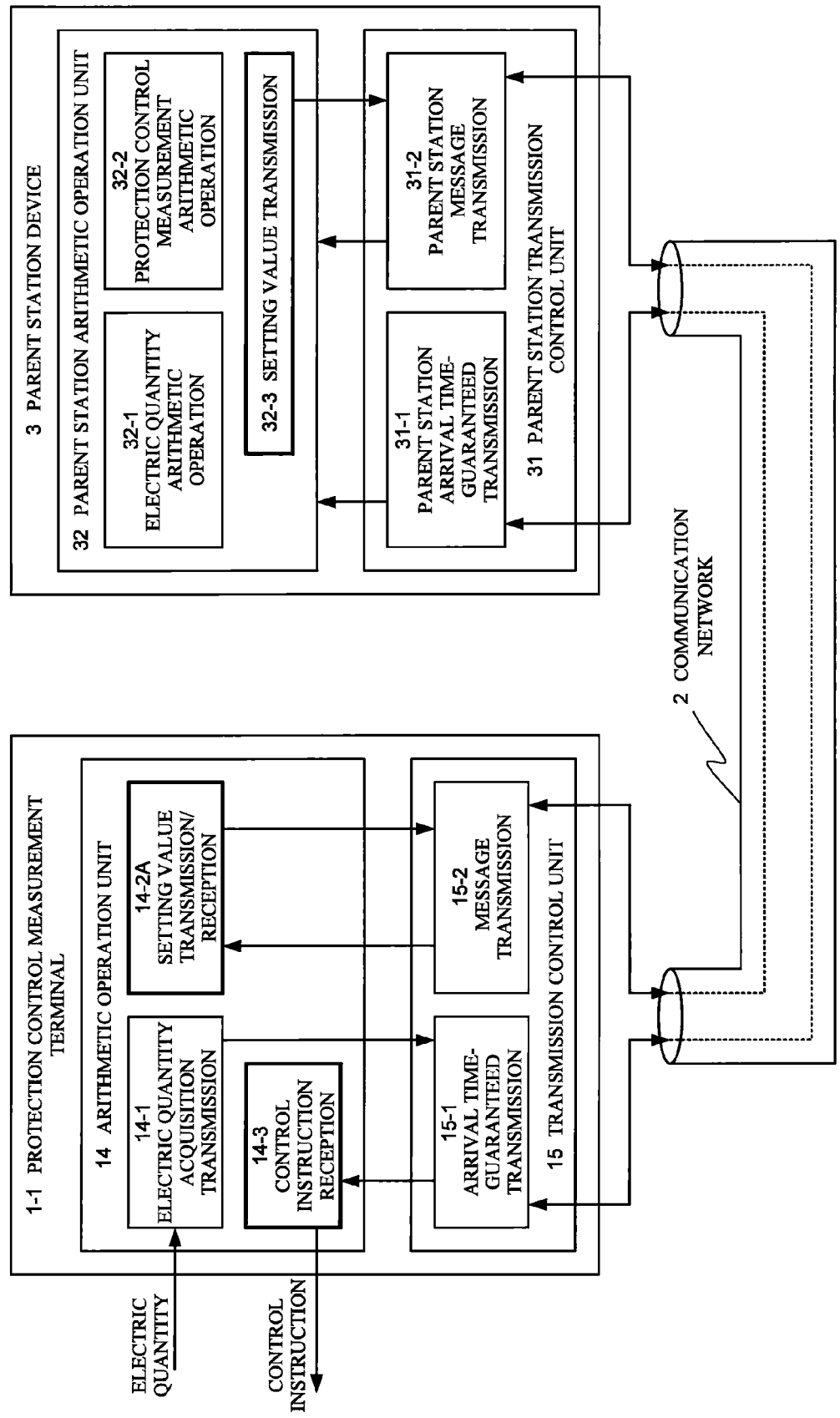
FIG. 14 shows an example of the specific configuration of a protection control measurement system in a second embodiment of the invention.

Next, the basic configuration of protection control measurement terminals 1 and a parent station device 3 of a second embodiment of the invention is explained, referring to FIG. 14. In this embodiment, the basic hardware configuration is the same as in the first embodiment, and an explanation is omitted.

A characteristic of the second embodiment is that arrival time-guaranteed transmission and message transmission between protection control measurement terminals 1 and the parent station device 3 over the communication network 2 can both be performed bidirectionally, and that setting values can be modified by the parent station device 3 via the communication network 2. Further, by outputting control instructions based on protection control measurement arithmetic operations to the protection control measurement terminals 1, the parent station device 3 can perform protection and control of an electric power system or similar from the protection control measurement terminals 1.

Specifically, as shown in FIG. 14, in the arithmetic operation processing unit 14 of a protection control measurement terminal 1 is newly provided setting value transmission/reception means 14-2A which not only transmits setting values to the parent station device 3 as in the previous embodiment, but also receives data via the message transmission means 15-2 in the transmission control unit 15. Further, control instruction reception means 14-3, which receives control instructions from the parent station device 3 such as instructions to trip a breaker of a system, is provided. And, the parent station device 3 comprises setting value transmission means 32-3 which transmits setting values, which are correction values, to protection control measurement terminals 1 via the parent station message transmission means 31-2.

[2.2 Action]

Next, the processing procedure to transmit setting value data, which are correction values, from the parent station device 3 to protection control measurement terminals 1 in the second embodiment configured as described above is explained.

First, under circumstances in which facility changes in the electric power system for monitoring, or degradation with aging of hardware in protection control measurement terminals 1, causes a decline in the accuracy of protection arithmetic operation results in the parent station device 3, the setting value transmission means 32-3 is used to transmit setting value data, which has been modified by the parent station device 3, to protection control measurement terminals 1. Specifically, setting value data transmitted by the setting value transmission means 32-3 is sent to the communication network 2 via the parent station message transmission means 31-2 of the parent station transmission control unit 31, and so arrives at a protection control measurement terminal 1.

In a protection control measurement terminal 1 which has received setting value data via the message transmission means 15-2, the setting value data is received by the setting value transmission/reception means 14-2A in the arithmetic operation processing unit 14, and the previously set setting values are modified to these setting values. By this means, settings of a protection control measurement terminal 1 can be modified from the parent station device 3 via the communication network 2.

Figure 9:
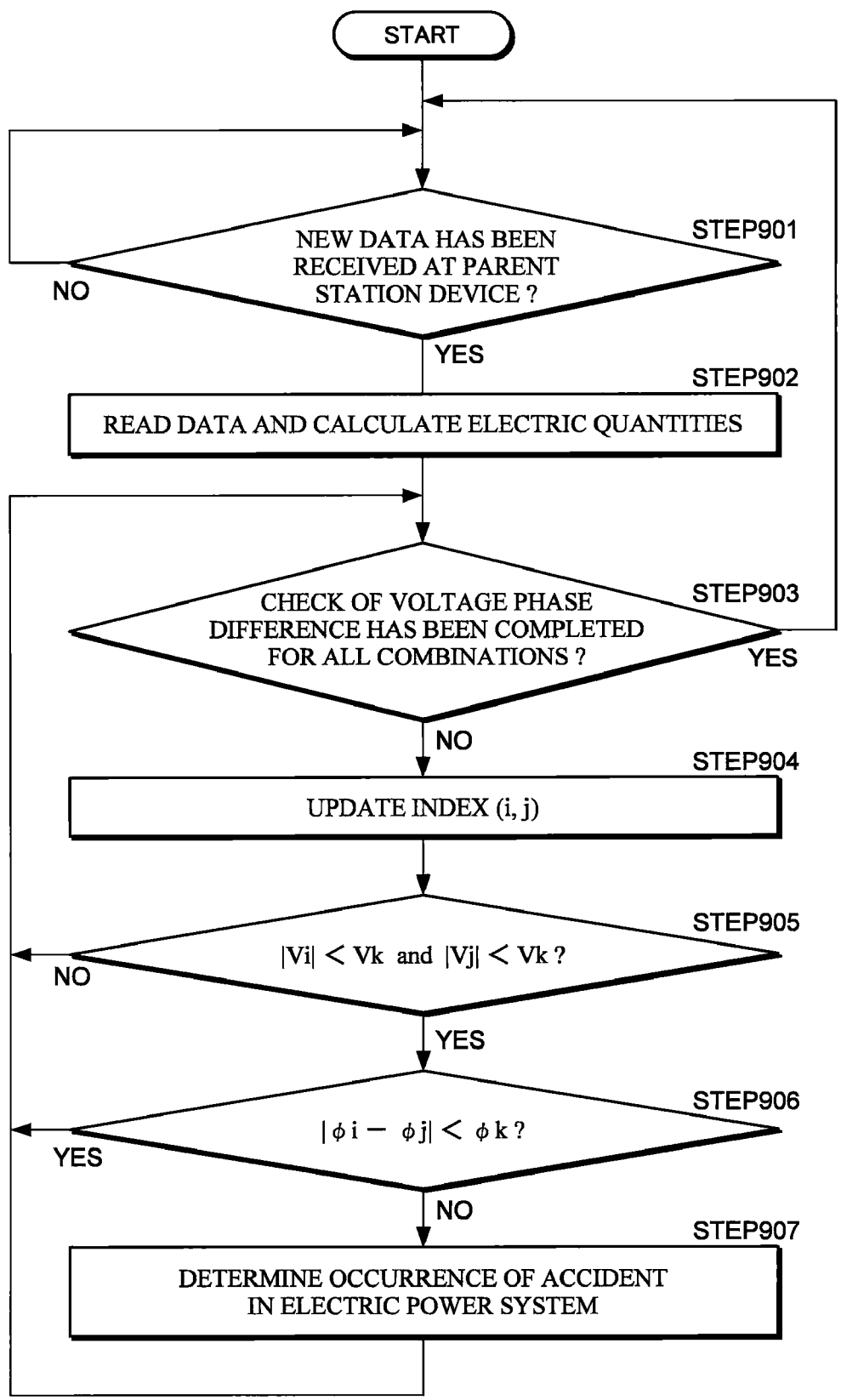
FIG. 9 is a flowchart showing an example of protection control measurement arithmetic operation processing in the parent station device of the first embodiment of the invention.

As a result of protection control measurement arithmetic operations in the protection control measurement arithmetic operation means 32-2 of the parent station device 3, when for example occurrence of a system accident is detected in step 907 in the flow of FIG. 9, control instructions to trip breakers of the system are output from the parent station device 3 to protection control measurement terminals 1, via the parent station arrival time-guaranteed transmission means 31-1. At a protection control measurement terminal 1, the control instruction is received by the control instruction reception means 14-3 provided in the arithmetic operation processing unit 14, and contact output of the protection control measurement terminal 1 is used to output a control instruction to the system, to cause the breaker to be tripped.

As explained above, in contrast with the first embodiment of the invention, a configuration mode is adopted enabling transmission of setting value data, electric quantity data, and control instructions bidirectionally between protection control measurement terminals 1 and a parent station device 3.

By means of this second embodiment, electric quantities and control instructions which are real-time data, and non-real-time setting value data, can be transmitted bidirectionally between protection control measurement terminals 1 and a parent station device 3, so that setting values can be modified from the parent station device 3 via the communication network 2. Further, control instructions can be issued from the parent station device 3 to the protection control measurement terminals 1, so that convenience of the protection control measurement system is improved, and maintainability is further enhanced.

3. Third Embodiment

Figure 15:
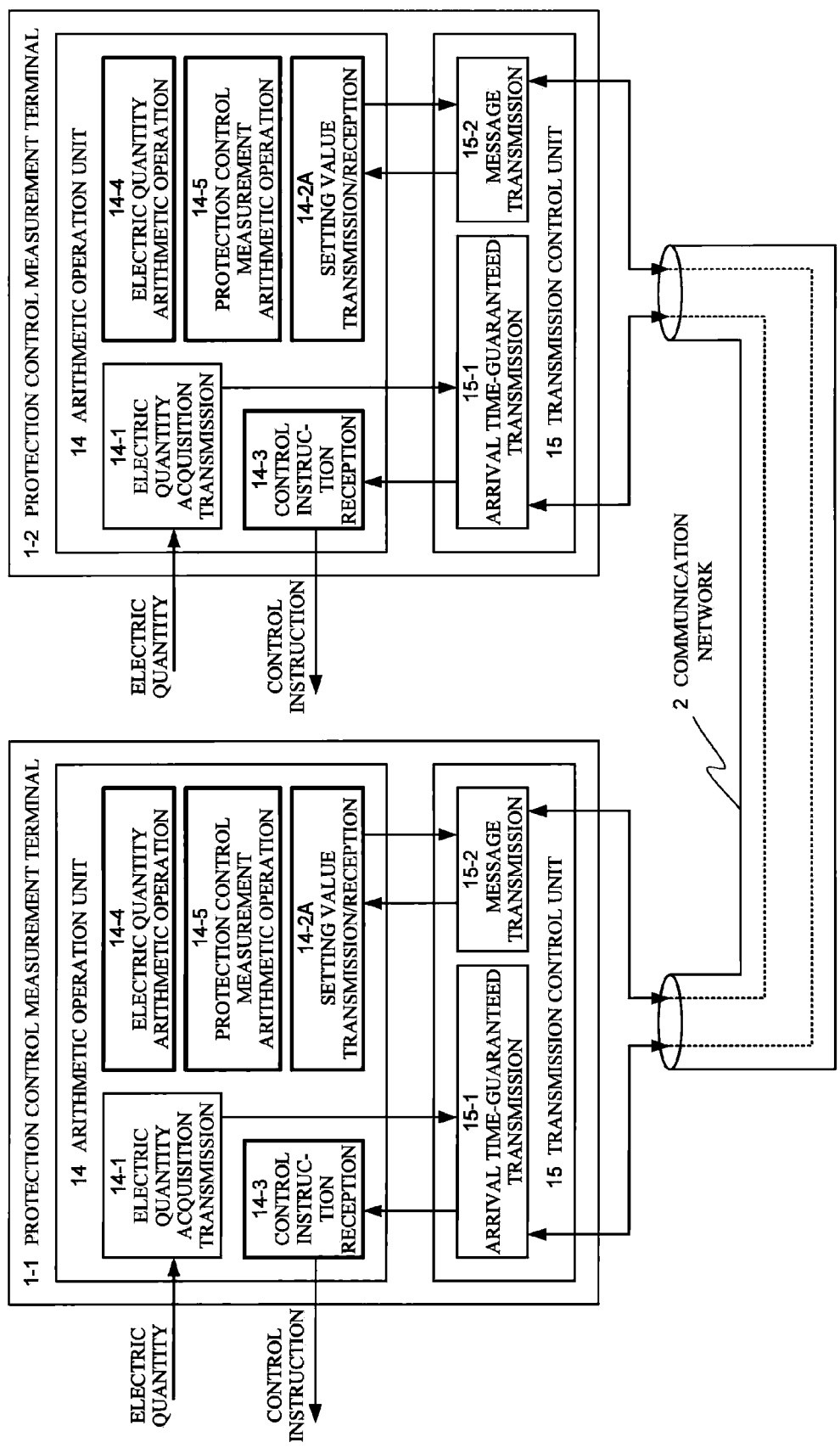
FIG. 15 shows an example of the specific configuration of a protection control measurement system in a third embodiment of the invention.

Next, the configuration of protection control measurement terminals 1 and a parent station device 3 in a third embodiment of the invention is explained, referring to FIG. 15. In this embodiment, the basic configuration of the hardware is the same as in the first and second embodiments, and explanations are omitted.

A characteristic of the third embodiment, is that means comprised by the parent station device 3 is present within the protection control measurement terminals 1. Specifically, within the arithmetic operation processing unit 14 of each of the protection control measurement terminals 1 are provided, in addition to the setting vale transmission/reception means 14-2A and control instruction means 14-3 provided in the second embodiment, electric quantity arithmetic operation means 14-4, which multiplies electric quantity data received by the arrival time-guaranteed transmission means 15-1 by setting values received by the message transmission means 15-2, to calculate electric quantities close to the true values, and protection control measurement arithmetic operation means 14-5, which performs protection control measurement arithmetic operations of the protection control measurement terminal 1.

By means of a protection control measurement terminal 1 having the configuration described above, collection of electric quantities can be performed in all protection control measurement terminals 1, and moreover protection control measurement arithmetic operations can be performed in any protection control measurement terminal 1, enabling functioning as a parent station device 3. Whether electric quantities are collected and protection control measurement arithmetic operations are performed can be switched through system operation settings.

Other Embodiments

This invention is not limited to the above first through third embodiments, but includes embodiments such as the following as well. For example, in the first embodiment, message transmission of setting value data by the message transmission means was not real-time transmission, that is, transmission did not have a guaranteed arrival time; however, this invention includes embodiments in which message transmission packets are transmitted using real-time transmission which, compared with arrival time-guaranteed transmission packets, has lower packet transmission priority, but in which the arrival time is guaranteed.

In this case priorities are provided among real-time transmission types in the communication network 2 as explained above (as an example, in the order of high speed, intermediate speed, low speed scan transmission), so that for example electric quantity data, which is in arrival time-guaranteed transmission packets, is allocated to high-speed scan transmission, and setting value data, which is in message transmission packets, is allocated to intermediate speed or low speed scan transmission.

Further, message transmission in this invention can also be performed with information relating to software versions and other maintenance-related information of the protection control measurement terminals 1 as data, in addition to correction values, filter functions, and other analog inputs.

Figure 16:
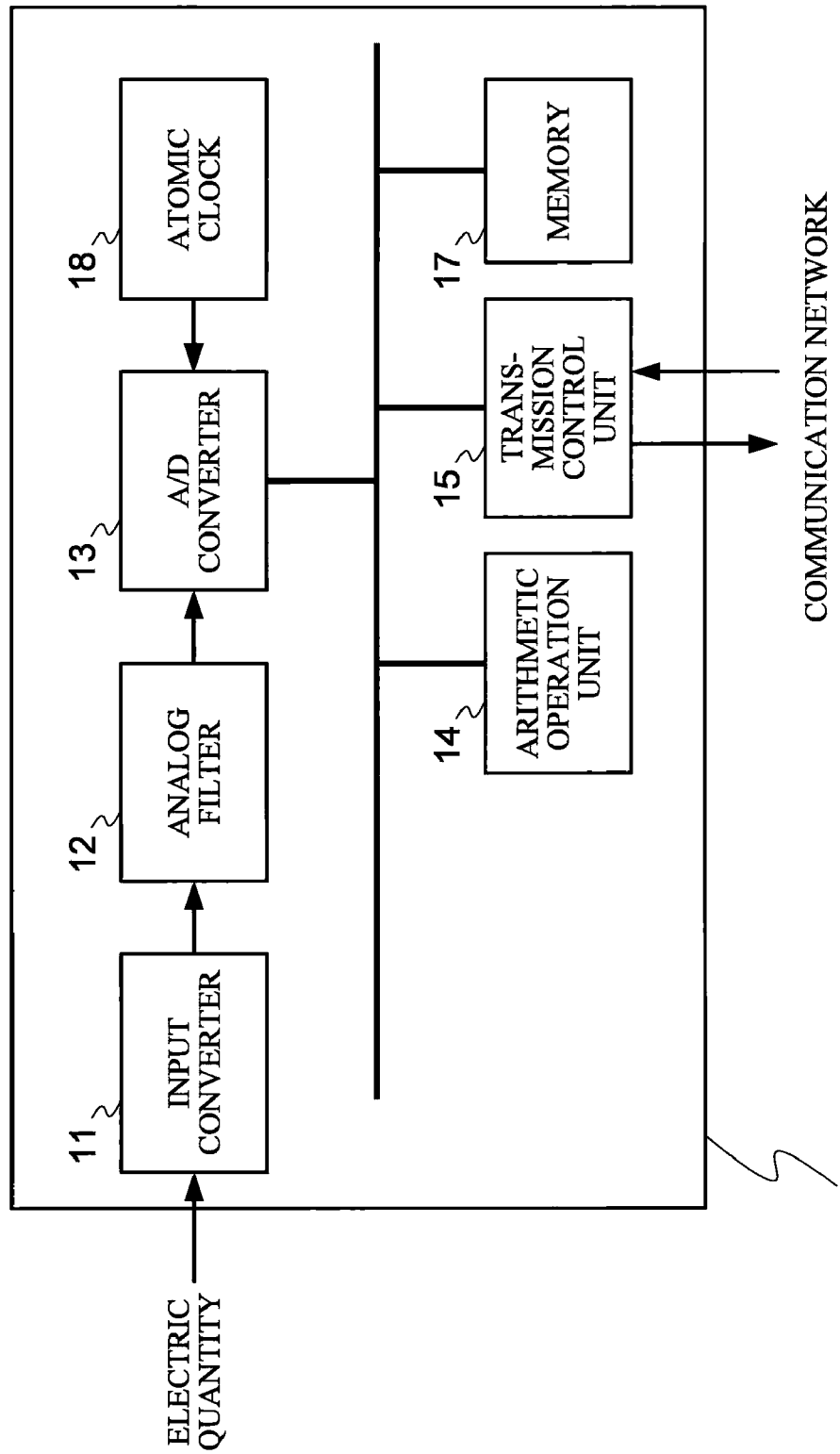
FIG. 16 shows an example of the configuration of a protection control measurement terminal in another embodiment of the invention.

In the above embodiments, Ethernet was adopted in the communication network 2; however, this invention also includes embodiments in which other transmission media, such as for example power line carriers, wireless LAN, SDH networks, or similar, are employed. Also, as shown in FIG. 16, this invention also includes embodiments in which, when acquiring electric quantities by a plurality of protection control measurement terminals, the times of atomic clocks 18 incorporated into the protection control measurement terminals are used to attach times to electric quantity data.

What is claimed is:

1. A protection control measurement system, comprising measurement terminals which acquire electric quantities from an electric power system a parent station device having arithmetic operation means for performing protection and control of the electric power system or measurement processing based on the electric quantities, and a communication network connecting the parent station device with at least one of the measurement terminals, wherein the measurement terminals each comprises real-time transmission means for transmitting the electric quantities to the parent station device within a prescribed time, and message transmission means for transmitting to the parent station device, as setting values, correction coefficients to improve the operation accuracy of the protection and control or measurement processing, a transmission priority of the message transmission being lower than that of the real-time transmission;

the real-time transmission means transmits the electric quantities within a prescribed time with higher priority than the message transmission over the communication network;

the message transmission means transmits the setting values within a prescribed time after transmission of the electric quantities over the communication network; and the arithmetic operation means performs correction in which the electric quantities received from the real-time transmission means are corrected using the setting values received from the message transmission means to calculate input electric quantities.

2. The protection control measurement system according to claim 1, wherein when a voltage phase difference of the input electric quantities exceeds a prescribed phase difference threshold under conditions in which the magnitude of a voltage of the input electric quantities is equal to or greater than a prescribed voltage threshold, the arithmetic operation means judges the presence of an anomaly in the electric power system.

3. The protection control measurement system according to claim 1, wherein the arithmetic operation means transmits control instructions to the measurement terminals when an anomaly is judged to be present in the electric power system, and the measurement terminals each executes control to trip breakers connected to the electric power system upon receiving the control instructions.

4. The protection control measurement system according to claim 1, wherein the communication network employs Ethernet.

5. The protection control measurement system according to claim 1, wherein the setting values are functions of analog filter characteristics of the measurement terminals.

6. The protection control measurement system according to claim 1, wherein the sampling timing when the measurement terminals acquire the electric quantities is generated based on radio signals received by a global positioning system (GPS), and the real-time transmission means transmits an absolute time obtained from the GPS in the same frame with the electric quantities.

7. The protection control measurement system according to claim 1, wherein, when the measurement terminals acquire the electric quantities, a time of an atomic clock incorporated within each measurement terminal is used to attach time to the electric quantities.

8. The protection control measurement system according to claim 1, wherein the parent station device comprises parent station message transmission means for transmitting to the measurement device, as setting values, correction coefficients to improve the operation accuracy of the protection and control or measurement processing, the transmission priority of the parent station message transmission being lower than that of the real time transmission, and the measurement terminals modify setting values set in advance to the setting values sent form the parent station message transmission means by receiving the setting values.

* * * * *